(12) United States Patent
Muschett et al.

(10) Patent No.: US 8,010,367 B2
(45) Date of Patent: Aug. 30, 2011

(54) SPOKEN FREE-FORM PASSWORDS FOR LIGHT-WEIGHT SPEAKER VERIFICATION USING STANDARD SPEECH RECOGNITION ENGINES

(75) Inventors: Brien H. Muschett, Palm Beach Gardens, FL (US); Julia A. Parker, Boca Raton, FL (US)

(73) Assignee: Nuance Communications, Inc., Burlington, MA (US)

( * ) Notice: Subject to any disclaimer, the term of this patent is extended or adjusted under 35 U.S.C. 154(b) by 959 days.

(21) Appl. No.: 11/768,526

(22) Filed: Jun. 26, 2007

(65) Prior Publication Data
US 2008/0154599 A1    Jun. 26, 2008

Related U.S. Application Data

(63) Continuation-in-part of application No. 11/615,900, filed on Dec. 22, 2006.

(51) Int. Cl.
*G10L 17/00* (2006.01)
(52) U.S. Cl. .................. 704/273; 704/243; 704/246
(58) Field of Classification Search .................. 704/273, 704/243, 246–250
See application file for complete search history.

(56) References Cited

U.S. PATENT DOCUMENTS

| | | | | |
|---|---|---|---|---|
| 5,265,191 A | * | 11/1993 | McNair | 704/273 |
| 5,913,192 A | * | 6/1999 | Parthasarathy et al. | 704/256.1 |
| 5,953,700 A | * | 9/1999 | Kanevsky et al. | 704/270.1 |
| 6,480,825 B1 | * | 11/2002 | Sharma et al. | 704/270 |
| 6,691,089 B1 | * | 2/2004 | Su et al. | 704/244 |
| 7,031,923 B1 | * | 4/2006 | Chaudhari et al. | 704/273 |
| 7,162,425 B2 | | 1/2007 | Lipe et al. | |
| 2003/0125944 A1 | * | 7/2003 | Wohlsen et al. | 704/246 |
| 2006/0293898 A1 | * | 12/2006 | Ollason | 704/273 |
| 2007/0033038 A1 | | 2/2007 | Strong | |

FOREIGN PATENT DOCUMENTS
CN    1262502 A    8/2000

OTHER PUBLICATIONS

Ramabhadran et al.; Acoustics-only based automatic phonetic baseform generation, ICASSP 1998, pp. 309-312.*
Bahl et al.; A method for the construction of acoustic Markov models for words, IEEE Transactions on speech and audio processing, vol. 1, No. 4, Oct. 1993, pp. 443-452.*

(Continued)

*Primary Examiner* — Abul Azad
(74) *Attorney, Agent, or Firm* — Wolf, Greenfield & Sacks, P.C.

(57) ABSTRACT

The present invention discloses a system and a method for authenticating a user based upon a spoken password processed though a standard speech recognition engine lacking specialized speaker identification and verification (SIV) capabilities. It should be noted that the standard speech recognition grammar can be capable of acoustically generating speech recognition grammars in accordance with the cross referenced application indicated herein. The invention can prompt a user for a free-form password and can receive a user utterance in response. The utterance can be processed through a speech recognition engine (e.g., during a grammar enrollment operation) to generate an acoustic baseform. Future user utterances can be matched against the acoustic baseform. Results from the future matches can be used to determine whether to grant the user access to a secure resource.

19 Claims, 3 Drawing Sheets

OTHER PUBLICATIONS

Halavati, R., et al., "A Novel Approach to Very Fast and Noise Robust, Isolated Word Speech Recognition, Isolated Word Speech Recognition", In't Conf. on Pattern Recognition, vol. 3, pp. 190-193, Sep. 20-24, 2006.

"Improving Voice Recognition Accuracy", IBM Technical Disclosure Bulletin, vol. 41, No. 409, Art. 409118, May 1998.

"Using Non-Verbal Attention Signals in a Speech Recognition System", IBM Technical Disclosure Bulletin, vol. 42, No. 418, Art. 41869, Feb. 1999.

* cited by examiner

310

| System Response: 312 | User Request: 314 |
|---|---|
| 1. Please say your password. Your password can be anything you wish. It is suggested that it be more than a single syllable.   320 | 2. jack sprat ate no fat   322 |
| 3. Say your password again.   324 | 4. jack sprat ate no fat   326 |
| 5. Say it one more time.   328 | 6. jack sprat ate no fat   330 |
| 7. Your password has been created. You said <audio recording of the user saying password is played>. Please remember your password.   332 | |

340

| System Response: 342 | User Request: 344 |
|---|---|
| 1. Welcome to ABC Bank.   350 Please say your user id. | 2. 555888   352 |
| 3. Please say your password.   354 | 4. jack sprat ate no fat   356 |
| 5. Welcome John Smith. This is the Main Menu.   358 | |

| | Identity   402 | Average confidence score   404 | Confidence in claimant   406 |
|---|---|---|---|
| 410— | Password Owner | .6700000166893005 | 100% |
| 412 { | Female Hacker #1 | .6450000107288360 | 97.49% |
| | Male Hacker #2 | .5020000300044440 | 83.20% |
| | Male Hacker #3 | .4831188111830123 | 81.31% |
| | Male Hacker #4 | .5600000238418578 | 89.00% |
| | Male Hacker #5 | .5649999976158142 | 89.49% |
| | Male Hacker #6 | .6550000011920929 | 98.49% |
| | Male Hacker #7 | .5499999821186066 | 87.99% |
| | Male Hacker #8 | .4799999892711 6394 | 80.99% |

FIG. 4

SPOKEN FREE-FORM PASSWORDS FOR LIGHT-WEIGHT SPEAKER VERIFICATION USING STANDARD SPEECH RECOGNITION ENGINES

CROSS-REFERENCE TO RELATED APPLICATIONS

This continuation-in-part application claims the benefit of U.S. patent application Ser. No. 11/615,900 filed Dec. 22, 2006, which is incorporated by reference herein.

BACKGROUND

1. Field of the Invention

The present invention relates to the field of speech processing, and, more particularly, to spoken free-form passwords for light-weight speaker verification using standard speech recognition engines.

2. Description of the Related Art

Conventional password security systems are generally based on a textual password. A proper password is stored within a security system which is compared against user input. When a successful match is made, the user is authenticated, otherwise user access to a secure resource can be denied. One problem with text based passwords is that unauthorized users (e.g., hackers) are sometimes able to access a security system's password table which grants them access to all associated secured resources. Additionally, numerous malicious programs and electronic devices, such as keyloggers, are specifically designed to capture text based passwords from authorized users.

Many security systems utilize biometric input to enhance security. Biometric input can include distinctive physical or behavioral characteristics of a user which are used to identity or verify a user. A common biometric technology is a speech processing technology referred to as speaker identification and verification (SIV). With SIV, users can be identified and verified utilizing specialized speech engines. SIV technologies require users to participate in a training session so that user-specific vocal tract characteristics can be determined. These characteristics or speech features can be stored for subsequent use. Subsequent to the SIV training, a user can be prompted by a SIV system to speak a system generated phrase. A responsively supplied user utterance can be SIV analyzed by a speech processing system to determine whether speech features extracted from the user utterance match the stored speech features. SIV utilizes specialized speech processing technologies that add a significant cost to a security system, even one already possessing speech recognition capabilities. In many situations, the benefits resulting from including SIV technologies do not justify the associated costs. What is needed is a means for enhancing security, which is resistant to malicious attacks and that does not require costly infrastructure upgrades.

BRIEF DESCRIPTION OF THE DRAWINGS

There are shown in the drawings, embodiments which are presently preferred, it being understood, however, that the invention is not limited to the precise arrangements and instrumentalities shown.

FIG. 3 illustrates a speech dialog showing an instance where a spoken free-form password is created and used in accordance with an embodiment of the inventive arrangements disclosed herein.

FIG. 4 is a table illustrating sample values of a test scenario of multiple different users speaking a stored password in accordance with an embodiment of the inventive arrangements disclosed herein.

DETAILED DESCRIPTION OF THE INVENTION

Figure 1:
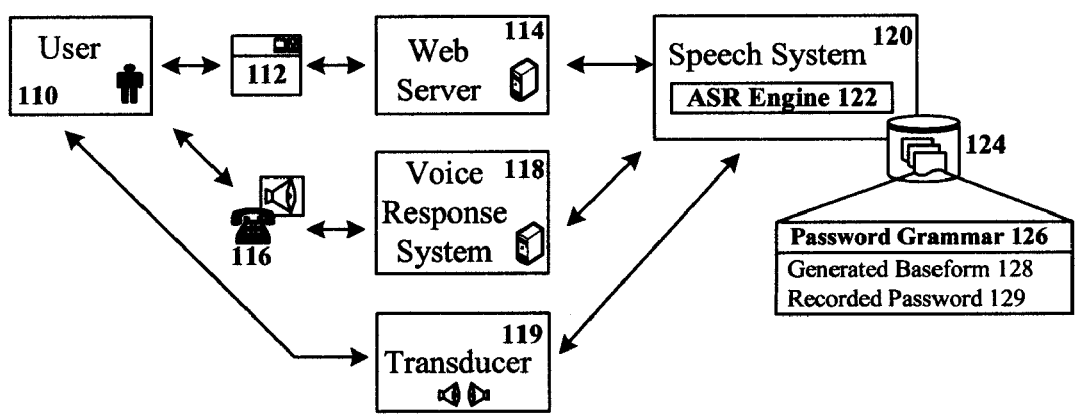
FIG. 1 is a schematic diagram of a speech processing system that includes speaker-dependent recognition grammars for passwords in accordance with an embodiment of the inventive arrangements disclosed herein.

FIG. 1 is a schematic diagram of a system 100 for a speech system that includes speaker-dependent recognition grammars for passwords in accordance with an embodiment of the inventive arrangements disclosed herein. In system 100, a user 110 can interact with a speech system 120, which includes an automated speech recognition (ASR) engine 122. A data store 124 can be used by system 120 to store one or more speech recognition grammars. The grammars of store 124 can include a password grammar 126. The speech system 120 can permit user 110 to provide audio from which recognition grammar entries are generated. These generated entries can include a password entry which is used to authenticate the user 110 for a secure resource. The password entry can be free-form in nature and can be any user 110 supplied utterance which can include any utter-able sound, word, phrase, etc. An acoustic baseform 128 can be generated from the password containing utterance which can also be recorded 129 and stored.

A user's interactions with the speech system 120 can occur through many different clients or interfaces. In one embodiment, user 110 can utilize a Web browser 112 to interact with Web server 114 provided content. Served Web pages can be speech-enabled content which is processed by speech system 120. In another embodiment, a voice only interface/device 116 can communicate with a voice response system 118 which uses the speech system 120 for speech processing operations. In still another embodiment, the speech system 120 can be part of an integrated device, such as a computer, kiosk, or mobile device, having an audio transducer 119 for accepting and presenting audio to and from the user 110.

The speech system 120 can be a commercial off-the-shelf speech processing system. The speech system 120 can acoustically generate baseforms using a variety of known techniques, such as those disclosed in the cross-referenced application entitled "SOLUTION THAT INTEGRATES VOICE ENROLLMENT WITH OTHER TYPES OF RECOGNITION OPERATIONS PERFORMED BY A SPEECH RECOGNITION ENGINE USING A LAYERED GRAMMAR STACK", U.S. patent application Ser. No. 11/615,900, filed Dec. 22, 2006. The ASR engine 122 can be a standard speech recognition engine instead of a speaker recognition engine which incorporates speaker identification and verification (SIV) technologies. Thus, the system 100 leverages ASR technologies to achieve lightweight speaker verification capabilities without the overhead or infrastructure requirements of a full function SIV system. Because system 100 stores baseforms 128 as password, the system 100 is more resistant to many malicious attacks than other systems that store and use text based passwords.

Figure 2:
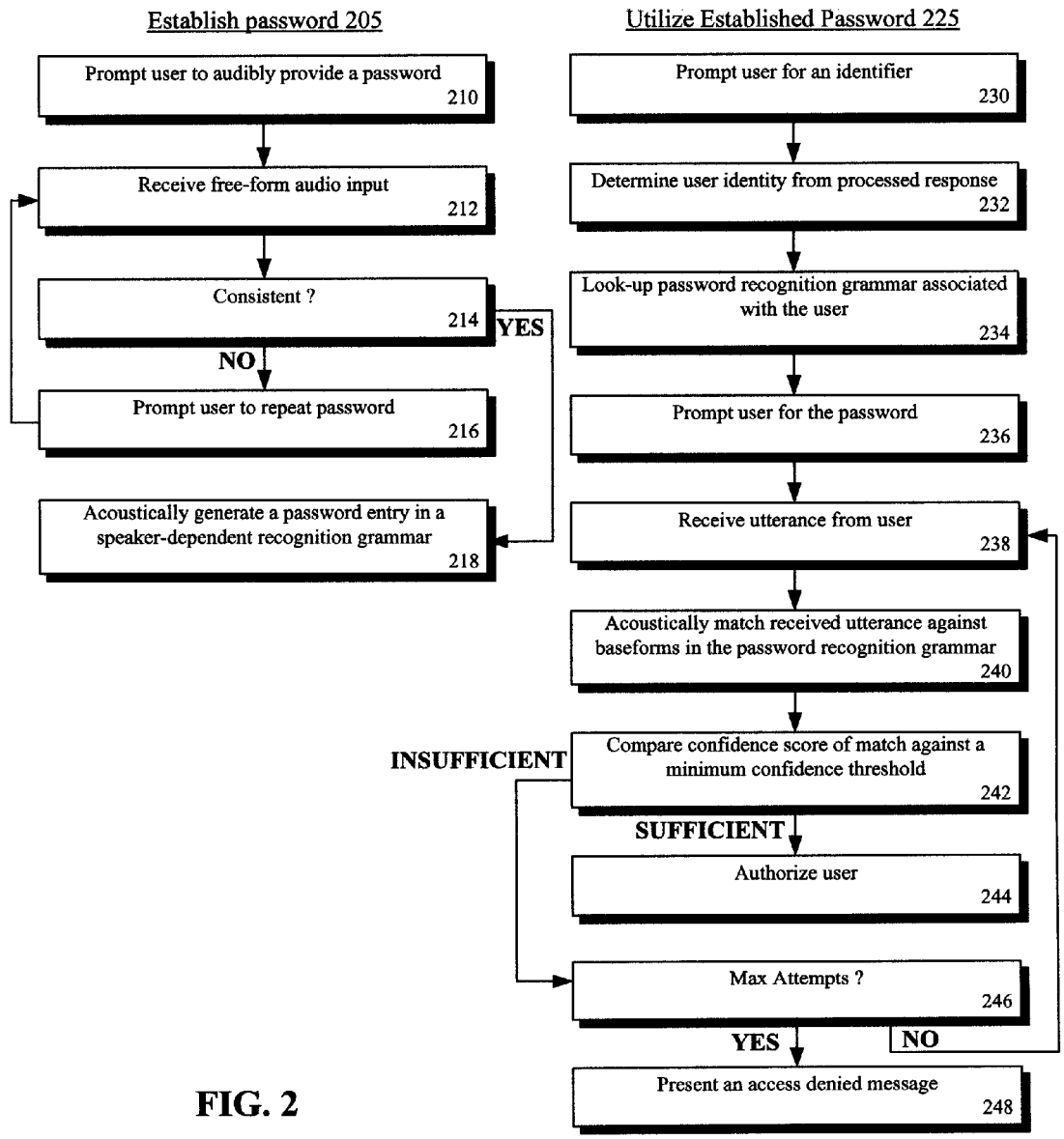
FIG. 2 is a flow chart of a method for creating and using spoken free-form passwords to authenticate users in accordance with an embodiment of the inventive arrangements disclosed herein.

FIG. 2 is a flow chart of a method 200 for creating and using spoken free-form passwords to authenticate users in accordance with an embodiment of the inventive arrangements disclosed herein. The method 200 can be performed in the context of a system 100 or any system having speech recognition capabilities and an ability to acoustically generate and use speaker dependent grammars. The method 200 includes a process 205 to establish a password and a process 225 to utilize established passwords.

The password establishment process 205 can begin in step 210, where a user can be prompted to audibly provide a password. The password can be free-form and can include any user generated utterance, such as a word, a phrase, or any other noise. In one embodiment, the utterance used for the password is used to generate an acoustic baseform and is not converted into text. Consequently, the utterance can be in any language or dialect and can include slang. The flexibility of the free-form utterance advantageously permits a user to create a highly unique password which is easy for the user to remember. Further, use of an acoustic baseform as a password is uniquely associated with a user's voice and is not readable by others (unlike textual passwords). Thus, acoustic baseform passwords are difficult for unauthorized users to steal by invading (i.e., hacking into) a security system.

In step 212, free-form audio input can be received in response to the password prompt. In step 214, a consistency check can optionally be performed against the free-form input. The consistency check can determine if the received audio input is sufficiently consistent with previously received utterances. If not, then the process can proceed from step 214 to step 216, where the user can be re-prompted for the password. The process can loop from step 216 to step 212, where audio input for the re-prompted password can be received. When consistency is achieved in step 214, the method can move to step 218, where an acoustic baseform for the password can be added to a speaker-dependent speech recognition grammar.

The password utilization process 225 can begin in step 230, where a user can be prompted for an identifier/account number. In step 232, results from the prompting can be processed and used to determine a user identity. In step 234, a recognition grammar associated with the user and a password context can be determined. In step 236, a user can be prompted for a password. In step 238, an utterance can be received from the user. In step 240, the utterance can be acoustically matched against the password recognition grammar.

In step 242, a confidence score generated from the matching can be compared against a minimum confidence threshold. When the score meets or exceeds the threshold, the process can progress from step 242 to step 244 where the user can be authorized to utilize the secure system. When the threshold is not exceeded, the process can progress from step 242 to step 246, where a determination can be made as to whether a maximum number of attempts has been made. If so, the user can be presented with an access denied message in step 248. If the maximum number of established attempts is not exceeded, the process can loop from step 246 to step 238 where another utterance can be received from the user.

FIG. 3 illustrates a speech dialog showing an instance where a spoken free-form password is created and used in accordance with an embodiment of the inventive arrangements disclosed herein. The speech dialog can be performed in the context of a system 100 or a method 200. The speech dialog includes a password establishment dialog 310 and a password usage dialog 340. Both dialogs 310 and 340 illustrate communications between an automated system 312, 342 and a user 314, 344.

In dialog 310, a voice prompt 320 can be audibly presented that prompts a user to speak a free-form password. A spoken response 322 of "jack sprat ate no fat" can be spoken in response. In one embodiment, a confusable phrase grammar can be queried to ensure that the spoken response 322 is not acoustically similar to pre-existing system commands, such as cancel, stop, quit, main menu, and the like. In dialog 310, the user supplied password is not likely to be confused with pre-existing commands.

To insure that new passwords will be accurately recognized when provided to a speech recognition engine, the automated system can prompt the user to repeat the password to insure a minimum number of consistent baseforms are generated. Thus, the system can re-prompt 324 a user, who repeats the password 326. A third prompting 328 can result in the password being uttered a third time 330.

In the dialog 310, an enrollment session can successfully complete after three successful consistent pronunciations are received. The best audio (322, 326, and/or 330) of the uttered password can be saved (i.e., a Media Resource Control Protocol (MRCP) save-best-waveform support function can be used in one configuration). The automated system can inform 332 a user that the phrase has been successfully enrolled. Additional information, such as a reminder to remember the password, a re-playing of the spoken password, recording size in bytes, recording duration in milliseconds, and the like, can optionally be presented 332 at this point in the dialog 310. The user provided acoustic baseform can be saved in an indexed fashion in a record or a file associated with the user. In one embodiment, the user utterances provided in dialog 310 can be saved and used to calibrate the automated system.

In dialog 340, a voice prompt 350 can ask a user to speak a user identifier, which the user speaks 352 in response. The automated system can then prompt 354 for a password. The user can utter 356 "jack sprat ate no fat." This is the same password created in dialog 310. A speech recognition system can compare the utterance against a stored baseform created in dialog 310, which results in a match with a relatively high confidence score. If the confidence score falls below a previously established threshold, the system can re-prompt the user. Otherwise, the system can successfully authenticate a user which results in the system presenting 358 a welcome message.

FIG. 4 is a table 400 illustrating sample values of a test scenario of multiple different users speaking a stored password in accordance with an embodiment of the inventive arrangements disclosed herein. The table 400 shows three columns including a speaker's identity 402, an average confidence score 404, and a system's confidence in a claimant 406. The table 400 is based on real-world test input for a spoken password of "jack sprat ate no fat." The table 400 assumes that each speaker 412 had somehow acquired an owner's 410 password and that multiple password requests are made to obtain the average values (404 and 406) for table 400.

More specifically, table 400 shows that a password owner 410 has an average confidence score of approximately 0.67 and a speaker confidence value of one hundred percent. Each other speaker 412 has lower values for the average confidence score and speaker confidence value. The table 400 shows only a password owner can be one hundred percent authenticated by a free-form password system, such as system 100. Thus, use of acoustic grammars spoken by a user into a standard speech recognition system increases system security. In one embodiment, confidence thresholds (over 0.665 in the example) can be established so that only an authorized speaker will be authenticated. The confidence threshold can be lowered to permit variance in the owner's 410 spoken password to still be accepted, which may result in some unauthorized access, such as Female Hacker #1 and/or Male Hacker #6. Thus, an established confidence score can be adjusted depending on whether a system is more concerned that some spoken utterance by an owner 410 is invalidated or is more concerned that some spoken utterance by others will be improperly validated.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method for authenticating a user, comprising:
   prompting a user for a free-form password in a password establishment dialog;
   receiving a user utterance;
   processing the utterance through a speech recognition engine to generate an acoustic baseform;
   associating the user with the acoustic baseform in a speaker-dependent password recognition grammar;
   matching, in a password usage dialog, user utterances against the acoustic baseform in the speaker-dependent password recognition grammar associated with the user, the matching thereby verifying both the free-form password and the user that provided the user utterance; and
   using results from the matching to determine whether to grant the user access to a secure resource.

2. The method of claim 1, wherein the speech recognition engine is a commercial off-the-shelf engine.

3. The method of claim 1, wherein the speech recognition engine lacks speaker identification and verification (SIV) specific capabilities for extracting vocal tract characteristics from speech and comparing these vocal tract characteristics against stored vocal tract characteristics for at least one of speaker identification and speaker verification purposes.

4. The method of claim 1, further comprising:
   repeating the prompting and receiving steps to ensure the user utterance is a good representation of a user's speech.

5. The method of claim 1, wherein the prompting occurs over a telephone user interface established between a user and a voice response system.

6. The method of claim 1, wherein the user interfaces with a speech-enabled Web server via a standard Web browser, wherein the prompting occurs through the Web browser.

7. The method of claim 1, further comprising:
   determining whether the received utterance is acoustically similar to entries in a pre-existing speech recognition grammar; and
   when the received utterance is acoustically similar, presenting a notification to that effect to the user and re-prompting the user for a different user utterance.

8. The method of claim 1, further comprising:
   storing the user utterance; and
   utilizing the stored user utterance within an audio prompt presented to the user.

9. The method of claim 1, further comprising:
   storing the user utterance; and
   utilizing the stored user utterance to calibrate parameters of the speech recognition engine.

10. The method of claim 1, wherein said steps of claim 1 are steps performed automatically by at least one machine in accordance with at least one computer program having a plurality of code sections that are executable by the at least one machine, said at least one computer program being stored in a machine readable memory.

11. A voice response system comprising:
    a speech recognition engine including an utterance enrollment capability;
    a grammar data store comprising at least one speaker-dependent password recognition grammar for storing acoustic baseforms used as passwords, wherein the acoustic baseforms of the grammar data store are generated by the speech recognition engine from user utterances; and
    a security engine configured to prompt a user for a spoken password, to match the spoken password against one of the stored acoustic baseforms in a speaker-dependent password recognition grammar associated with the user, the matching thereby verifying both the spoken password and the user that provided the spoken password, and to selectively grant access to a secure resource based upon results of the matching of the spoken password against the stored acoustic baseforms.

12. The system of claim 11, wherein the speech recognition engine is a commercial off-the-shelf engine.

13. The system of claim 11, wherein the speech recognition engine lacks speaker identification and verification (SIV) specific capabilities for extracting vocal tract characteristics from speech and comparing these vocal tract characteristics against stored vocal tract characteristics for at least one of speaker identification and speaker verification purposes.

14. The system of claim 11, wherein the system is a Web based system, which uses a Web browser to interface between the voice response system and the user.

15. The system of claim 11, wherein the system is an interactive voice response system, which interacts with the user through a telephone user interface.

16. The system of claim 11, wherein the system is part of a stand-alone computing system having speech processing capabilities, which are able to be utilized by a user in an off-line mode.

17. A method for using speech passwords comprising:
    an automated system determining a user identity;
    ascertaining at least one speaker-dependent password recognition grammar associated with the determined user identity;
    prompting for a password;
    receiving a spoken utterance;
    comparing the spoken utterance against acoustic baseforms contained in the ascertained speaker-dependent password recognition grammar, the comparing thereby verifying both the password and the user identity; and selectively granting access to a secure resource based upon results of the comparing step.

18. The method of claim 17, wherein the password is a free-form password previously established by a user associated with the determined user identity.

19. The method of claim 17, wherein said steps of claim 18 are steps performed automatically by at least one machine in accordance with at least one computer program having a plurality of code sections that are executable by the at least one machine, said at least one computer program being stored in a machine readable memory.

* * * * *

UNITED STATES PATENT AND TRADEMARK OFFICE
CERTIFICATE OF CORRECTION

PATENT NO.        : 8,010,367 B2               Page 1 of 1
APPLICATION NO.   : 11/768526
DATED             : August 30, 2011
INVENTOR(S)       : Brien H. Muschett et al.

It is certified that error appears in the above-identified patent and that said Letters Patent is hereby corrected as shown below:

At column 8, claim 19, line 1 should read as follows:

19. The method of claim 17, wherein said steps of claim 17

Signed and Sealed this
Twenty-first Day of February, 2012

David J. Kappos
*Director of the United States Patent and Trademark Office*